United States Patent

[11] 3,624,078

| [72] | Inventors | Ernst Jucker<br>Ettingen/Basel-Land;<br>Adolf J. Lindenmann, Basel; Fulvio<br>Gadient, Birsfelden Basel-Land, all of<br>Switzerland |
|---|---|---|
| [21] | Appl. No. | 245,686 |
| [22] | Filed | Dec. 19, 1962 |
| [45] | Patented | Nov. 30, 1971 |
| [73] | Assignee | Sandoz Ltd.<br>Basel, Switzerland |
| [32] | Priorities | Dec. 21, 1961 |
| [33] | | Switzerland |
| [31] | | 14762/61;<br>Apr. 11, 1962, Switzerland, No. 4431/62 |

[54] 6H-DIBENZ[B-E]THIEPIN DERIVATIVES
16 Claims, No Drawings

[52] U.S. Cl. .................................................. 260/240 TC,
260/247.1, 260/268 TR, 260/293.4 D,
260/326.5 SA, 260/326.81, 260/327 B, 260/470,
260/516, 424/248, 424/250, 424/267, 424/274,
424/275

[51] Int. Cl. .............................................. C07d 67/00
[50] Field of Search .................................... 260/240,
327

[56] References Cited
FOREIGN PATENTS
607,503  2/1962  Belgium ...................... 260/327
OTHER REFERENCES
Protiva et al., Experientia, Vol. 18 (7-15-62) pp. 326-8.

Primary Examiner—James A. Patten
Attorney—Irwin Morton Aisenberg

ABSTRACT: Disclosed are aminoalkyldibenzothiepines useful as medicaments, particularly as antihistaminics.

6H-DIBENZ[B-E]THIEPIN DERIVATIVES

This invention relates to new heterocyclic compounds, acid addition salts thereof and pharmaceutical compositions containing the same.

The present invention provides 6H-dibenz[b,e]thiepin derivatives of the formula:

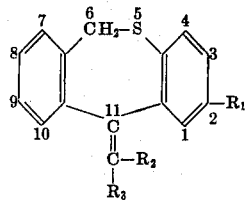

wherein $R_1$ is a member selected from the group consisting of halogen, lower alkyl, lower alkoxy and lower alkylthio, $R_2$ stands for hydrogen, $R_3$ represents a member selected from the group consisting of lower dialkylamino ethyl, piperidino ethyl, pyrrolidino ethyl, morpholino ethyl, 2-(piperidino)-1-lower alkyl ethyl, and $R_2$ and $R_3$ together with the carbon atom to which they are joined represent 1-lower alkyl-piperidylidene-(4); their acid addition salts with organic and inorganic acids and pharmaceutical compositions comprising, in addition to an inert carrier, a said compound and/or its acid addition salt in a therapeutically effective amount.

The aforesaid 6H-dibenz[b,e]thiepin derivatives of the formula I and their acid addition salts are prepared in that a 11-hydroxy-6H-dibenz[b,e]thiepin derivative of the formula:

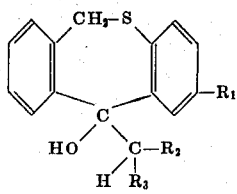

wherein $R_1$, $R_2$ and $R_3$ have the above significance, is treated with an agent for splitting off water and, when an acid addition salt is required, the resulting compound of the formula I is salified with an organic or inorganic acid.

The compound of formula IV may be produced by reacting a 6H-dibenz[b,e]thiepin-11-one derivative of the formula:

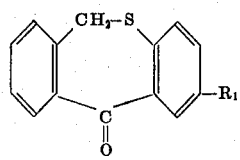

wherein $R_1$ has the above significance, with a magnesium compound of the formula:

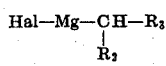

wherein $R_2$ and $R_3$ have the above significance and Hal is a member selected from the group consisting of chlorine, bromine and iodine, and hydrolyzing the resulting reaction product.

The compounds of the invention may, for example, be produced as follows: A solution of a basically substituted halogenoalkyl derivative in tetrahydrofuran or diethyl ether is added to magnesium shavings covered with tetrahydrofuran or diethyl ether respectively. Instead of magnesium it is possible to use a copper magnesium alloy (according to Gilman).

The following basically substituted halogenoalkyl derivatives may be used: Dialkylamino-alkyl halides, e.g., dimethylaminopropyl chloride, diethylaminopropyl chloride, diethylaminopropyl bromide or 3-dimethylaminobutyl chloride; piperidino-, pyrrolidino-, or morpholino-alkyl halides, e.g. piperidino-propyl chloride, piperidino-propyl iodide, piperidino-2-methyl-1-propyl chloride, pyrrolidino-propyl chloride, pyrrolidino-propyl bromide or morpholino-propyl chloride; 1-alkyl-4-halogeno-piperidines, e.g. 1-methyl-4-chloro-piperidine; 1-alkyl-piperidyl-alkyl halides or 1-alkyl-pyrrolidyl-alkyl halides, e.g. 1-methyl-piperidyl-(3)-methyl chloride, 1-methyl-pyrrolidyl-(3)-methyl chloride, 1-methyl-piperidyl-(2)-ethyl chloride, 1-isopropyl-piperidyl-2-ethyl chloride or 1-methyl-pyrrolidyl-2-ethyl chloride.

The formation of the Grignard reagent is preferably catalyzed by adding a small amount of ethylene bromide, ethyl bromide or methyl iodide and a trace of iodine. If desired the reaction mixture is heated under reflux to complete the reaction. The resulting Grignard reagent is then mixed with a 6H-dibenz[b,e]thiepin-11-one of the formula II, dissolved in the same solvent as is used for the Grignard reagent and the mixture stirred and heated to complete the reaction. The reaction mixture is subsequently hydrolyzed at ambient temperature with aqueous ammonium chloride solution and extracted with an organic solvent which is immiscible with water, preferably diethyl ether or benzene. The 11-hydroxy-6H-dibenz[b,e]thiepin derivative of formula IV obtained as intermediate product may, if desired, be purified by chromatography or crystallization, or worked up further as such.

Water is split off, for example, by heating the compound IV in glacial acetic acid solution with concentrated hydrochloric acid. This operation can, however, also be effected with another agent for spliting off water, e.g., phosphorus oxychloride, thionyl chloride or zinc chloride. The resulting 6H-dibenz[b,e]thiepin derivative of formula I is isolated and purified by known methods and, if desired, converted into an acid addition salt.

The compounds I are basic compounds which form relatively stable salts, crystalline at room temperature, with inorganic or organic acids, e.g. hydrochloric, hydrobromic, hydriodic, sulfuric, citric, tartaric, succinic, maleic, malic acetic, benzoic, hexahydrobenzoic, methanesulfonic, fumaric, and gallic acid.

The new 6H-dibenz[b,e]thiepin derivatives of the present invention are suitable pharmaceuticals in view of their excellent pharmacodynamic properties, having numerous effects on the nervous system. They exert narcosis potentiating, sedative, antipyretic, hypotherneal, adrenolytic, serotonin inhibiting and especially antihistaminic effects. For example, 2-methyl-11-[1'-methyl-piperidylidene-(4')]6H-dibenz[b,3]thiepin has a particularly pronounced serotonin-inhibiting effect, while 2-chloro-11-[1'-methyl-piperidylidene-(4')]-6H-dibenz[b,e]thiepin has a very marked antihistaminic effect. The new 6H-dibenz[b,e]thiepin derivatives may therefore be used as medicaments.

The compounds of formula II which are used as starting materials are new. The symbol $R_1$ may signify a halogen atom, e.g., chlorine, bromine, iodine or fluorine, an alkyl, alkoxy, or an alkylthio radical, e.g., methyl, ethyl, propyl or isopropyl, methoxy, ethoxy, propoxy or isopropoxy, methylthio, or ethylthio radicals.

The starting materials may be produced in the following manner: A 2-halogeno-methyl-benzoic acid alkyl ester of the formula:

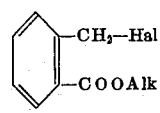

in which Hal represents a chlorine or bromine atom and Alk represents lower alkyl, is condensed by heating with a thiophenol derivative of the formula:

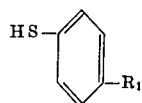

in which $R_1$ has the above significance, in the presence of a low molecular weight aliphatic alcohol, e.g. ethanol, and the amount of sodium hydroxide calculated for the formation of the sodium salt to give a 2-(phenylthiomethyl)-benzoic acid alkyl ester derivative and subsequently saponified to give the free acid of the formula:

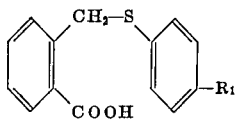

wherein $R_1$ has the above significance. Subsequent cyclization to give a compound II can be carried out either using the free acid of formula VII or a corresponding acid halide.

When using the free acid the cyclization procedure is as follows: The acid of formula VII is added in portions to polyphosphoric acid (which may be obtained by mixing concentrated orthophosphoric acid and phosphorus pentoxide) at approximately 100° to approximately 200° C. In order to complete the cyclization, the reaction mixture is kept at the same temperature for several hours. After adding ice, the reaction mixture is extracted with benzene. The compound of formula II is isolated and purified by known methods.

Cyclization using an acid halide is carried out as follows: The free acid of formula VII is first reacted with a halogenating agent, e.g., thionyl chloride or thionyl bromide, and the resulting acid halide cyclized by heating with aluminum chloride in carbon disulfide or a chlorinated hydrocarbon, e.g., 1,1,2,2-tetrachloroethane.

In the following nonlimitative examples, all temperatures are stated in degrees Centigrade and the melting and boiling points are uncorrected.

EXAMPLE 1

2-methyl-11-[1'-methyl-piperidylidene-(4')]-6H-dibenz [b,e] thiepin a. 2-methyl-11-[1'-methyl-piperidyl-(4')]-11-hydroxy-6H-dibenz [b,e] thiepin 2.4 g. of iodine activated magnesium are covered with a little tetrahydrofuran and 0.1 cc. of ethylene bromide are added. When the reaction commences, a solution of 13.4 g. of 1-methyl-4-chloro-piperidine in 20 cc. of tetrahydrofuran is added dropwise at such a rate that the solvent boils. The reaction mixture is subsequently heated to boiling for 3 hours. A solution of 12.0 g. of 2-methyl-6H-dibenz [b,e] thiepin-11-one in 40 cc. of tetrahydrofuran is then added over 45 minutes to this Grignard solution and it is then heated to boiling for 2 hours, while stirring. After cooling, the reaction mixture is poured into a solution of 45 g. of ammonium chloride in 300 cc. of water, diluted with 300 cc. of ether and filtered through highly purified diatomaceous earth. After separating the ethereal phase, the aqueous part is shaken out three times, each time with 300 cc. of ether. The united ethereal solutions are washed with water, dried over magnesium sulfate and evaporated. The oily residue is dissolved in 30 cc. of acetone, whereupon the 2-methyl-11-[1'-methyl-piperidyl-(4')]-11-hydroxy-6H-dibenz [b,e] thiepin commences to crystallize. The compound, after recrystallizing from acetone, melts at 181°-183°.

b. 2-methyl-11-[1'-methyl-piperidylidene-(4')]-6H-dibenz [b,e] thiepin.

A solution of 3.0 g. of 2-methyl-11-[1'-methyl-piperidyl-(4')]-11-hydroxy-6H-dibenz [b,e] thiepin in 30 cc. of glacial acetic acid is heated to boiling for 30 minutes with 12 cc. of concentrated hydrochloric acid and then evaporated at a pressure of 15 mm. Hg. The residue is made alkaline with 2N sodium hydroxide and shaken out three times, each time with 50 cc. of chloroform. After washing with water and drying over magnesium sulfate, the chloroform extract is evaporated to dryness and a solution of the residue in 20 cc. of ethanol saturated with gaseous hydrogen bromide, whereupon the 2-methyl-11-[1'-methyl-piperidylidene-(4')]-6H-dibenz [b,e] thiepin hydrobromide separates in crystalline form. After recrystallizing from ethanol, the hydrobromide melts at 294°-297°.

The 2-methyl-6H-dibenz [b,e] thiepin-11-one, used as starting material, is produced as follows:

2-(p-tolylthiomethyl)-benzoic acid ethyl ester

One hundred sixty five g. of 2-chloromethyl-benzoic acid ethyl ester (produced from o-toluic acid ethyl ester, sulphuryl chloride and dibenzoyl peroxide; b.p. 85°-88°/0.03 mm. Hg) are added dropwise to a solution of 104.0 g. of p-thiocresol (b.p. 75°/16 mm. Hg) and 33.4 g. of sodium hydroxide in 170 cc. of water and 635 cc. of ethanol. The mixture is heated to boiling under reflux for 1 hour. After cooling, the resulting sodium chloride precipitate is filtered and the filtrate reduced in volume in a vacuum of 12 mm. Hg. The residue is taken up in 800 cc. of chloroform, shaken with 160 cc. of ice-cold N sodium hydroxide solution, washed until neutral and dried over magnesium sulfate. After removing the chloroform and separating first runnings distilling at 13 mm. Hg, the resulting 2-(p-tolylthiomethyl)-benzoic acid ethyl ester is distilled at an air-bath temperature of 145°-150° under a pressure of 0.02 mm. Hg.

2-(p-tolylthiomethyl)-benzoic acid

Four hundred sixty g. of 2-(p-tolylthiomethyl)-benzoic acid ethyl ester are heated to boiling for 75 minutes in a solution of 72.0 g. of sodium hydroxide in 510 cc. of water and 590 cc. of ethanol. The reaction solution is then reduced in volume at a pressure of 12 mm. Hg., diluted with 1,200 cc. of water and washed with 500 cc. of chloroform. The aqueous alkaline solution is acidified with 5N hydrochloric acid and extracted with 3,000 cc. chloroform. After washing the chloroform extract with water and drying over magnesium sulfate, it is reduced in volume to a certain extent and pentane is added, whereupon the resulting 2-(p-tobylthiomethyl)-benzoic acid is separated. After recrystallization from ethanol/pentane, the compound melts at 130°-131°.

2-methyl-6H-dibenz [b,e] thiepin-11-one

Three hundred g. of phosphorus pentoxide are added to 207 cc. of 85 percent phosphoric acid at 80°-100°, while stirring well. The temperature is then maintained at 100°. One hundred five g. of 2-(p-tolylthiomethyl)-benzoic acid are added over 10 minutes to the resulting polyphosphoric acid and the reaction mixture is stirred for 75 minutes at 100°. The mixture is then poured, while hot, on to 1 kg. of ice and diluted with 600 cc. of benzene. After filtering through highly purified diatomaceous earth, the benzene solution is separated and the aqueous phase shaken out twice, each time with 200 cc. of benzene. The united benzene extracts are extracted three times, each time with 100 cc. of 2N sodium hydroxide solution, washed until neutral with water and dried over magnesium sulfate. After removing the solvent in a vacuum, the solution of the crystalline residue in boiling ethanol is purified with animal charcoal and cooled, whereupon the resulting 2-methyl-6H-dibenz [b,e] thiepin-11-one precipitates in crystalline form. After recrystallization from ethanol, the compound melts at 121°-122°.

EXAMPLE 2

2-methyl-11-[1'-dimethylaminopropylidene-(3')]-6H-dibenz [b,e] thiepin a. 2-methyl-11-[1'-dimethylaminopropyl-(3')]-11-hydroxy-6H-dibenz [b,e] thiepin 2.4 g. of iodine-activated magnesium are covered with a little tetrahydrofuran and 0.1 cc. of ethylene bromide added. When the reaction commences, a solution of 12.2 g. of 3-dimethylamino-1-propyl chloride in 20 cc. of tetrahydrofuran is added at such a rate that the solvent boils. The reaction mixture is then heated to boiling for 2 hours. A solution of 12.0 g.

of 2-methyl-6H-dibenz [b,e] thiepin-11-one in 40 cc. of tetrahydrofuran is then added over a period of 30 minutes to this Grignard solution and stirred for a further 10 minutes at this temperature. Further operations are as described in example 1a. After purification with animal charcoal and recrystallization from acetone, the resulting 2-methyl-11-[1'-dimethylaminopropyl-(3')]-11hydroxy-6H-dibenz [b,e] thiepin melts at 139°–142°.

b. 2-methyl-11-[1'-dimethylaminopropylidene-(3')]-6H-dibenz [b,e] thiepin

A solution of 4.0 g. of 2-methyl-11-[1'-dimethyl-aminopropyl-(3')]-11-hydroxy-6H-dibenz [b,e] thiepin in 40 cc. of glacial acetic acid is heated to boiling for 1 hour with 16 cc. of concentrated hydrochloric acid. Further operations are as described in example 1b. The resulting oily 2-methyl-11-[1'-dimethylamino-propylidene-(3')]-6H-dibenz [b,e] thiepin is reacted with ethanolic oxalic acid. After recrystallization from ethanol, the acid oxalate melts at 189°–192°.

EXAMPLE 3

2-chloro-11-[1'-methyl-piperidylidene-(4')]-6H-dibenz [b,e] thiepin a. 2-chloro-11-[1'-methyl-piperidyl-(4')]-11-hydroxy-6H-dibenz [b,e] thiepin 2.4 g. of iodine activated magnesium are covered with a little tetrahydrofuran and 0.1 cc. of ethylene bromide added. When the reaction commences, a solution of 13.4 g. of 1-methyl-4-chloro-piperidine in 20 cc. tetrahydrofuran is added dropwise at such a rate that the solvent boils. The reaction mixture is then heated to boiling for 3 hours. A solution of 13.0 g. of 2-chloro-6H-dibenz [b,e] thiepin-11-one in 30 cc. tetrahydrofuran is added over 30 minutes at zero degrees to this Grignard solution and then stirred for a further 30 minutes at the same temperature. Further operations are as described in example 4a. After purification with animal charcoal and recrystallization from acetone, the resulting 2-chloro-11-[1'-methyl-piperidyl-(4')]-11-hydroxy-6H-dibenz [b,e] thiepin melts at 182°–184°.

b. 2-chloro-11-[1'-methyl-piperidylidene-(4')]-6H-dibenz [b,e] thiepin

A solution of 6.0 g. of 2-chloro-11-[1'-methyl-piperidyl-(4')]-11-hydroxy-6H-dibenz [b,e] thiepin in 60 cc. of glacial acetic acid is heated to boiling for 1 hour with 18 cc. of concentrated hydrochloric acid. Further operations are as described in example 1b. After recrystallization from acetone, the resulting 2-chloro-11-[1'-methyl-piperidylidene-(4')]-6H-dibenz [b,e] thiepin melts at 161°–164°.

The 2-chloro-6H-dibenz [b,e] thiepin-11-one, used as starting material, is produced as follows:

2-(p-chlorophenylthiomethyl)-benzoic acid ethyl ester

One hundred twenty g. of 2-chloromethyl-benzoic acid ethyl ester (b.p. 85°–88°/0.03 mm. Hg.) are added dropwise to a solution of 88.0 g. of p-chlorothiophenol, 24.3 g. of sodium hydroxide in 145 cc. of water and 540 cc. of ethanol. The mixture is heated to boiling under reflux for 75 minutes. Further operations are as described in example 1b. (Production of starting material). The 2-(p-chlorophenylthiomethyl)-benzoic acid ethyl ester distils at 176°–178° under a pressure of 0.1 mm. Hg.

2-(p-chlorophenylthiomethyl)-benzoic acid

One hundred thirty-nine g. of 2-(p-chlorophenylthiomethyl)-benzoic acid ethyl ester are heated to boiling for 1 hour in a solution of 21.0 g. of sodium hydroxide in 125 cc. of water and 105 cc. of ethanol. Further operations are as described in example 1b. (Production of starting material). After recrystallization from chloroform/pentane, the acid melts at 134°–135°.

2-chloro-6H-dibenz [b,e] thiepin-11-one

Cyclization of 2-(p-chlorophenylthiomethyl)-benzoic acid with polyphosphoric acid is effected in a manner analogous to that described in example 1b. (Production of starting material). After recrystallization from ethanol, the compound melts at 134°–136°.

Cyclization may also be carried out with aluminum chloride in 1,1,2,2-tetrachloroethane. The following procedure is used: 48.5 g. of 2-(p-chlorophenylthiomethyl)-benzoyl chloride [b.p. 178°–180°/0.1 mm. Hg.; produced from 2-(p-chlorophenylthiomethyl)-benzoic acid and thionyl chloride] in 250 cc. of 1,1,2,2-tetrachloroethane are added dropwise to 57.0 g. of aluminum chloride in 320 cc. of 1,1,2,2-tetrachloroethane over a period of 1½ hours at 90° and stirred for 24 hours at the same temperature. The solvent is then removed by vacuum distillation, 500 cc. of benzene are added to the residue and, while cooling, 500 g. of ice with 80 cc. of concentrated hydrochloric acid added. The benzene solution is separated and the aqueous phase shaken out with a further 200 cc. of benzene. The united benzene extracts are shaken out twice, each time with 100 cc. of 2N sodium hydroxide and washed until neutral with water. After drying over magnesium sulfate, the benzene is distilled away. The crude produce is purified by boiling in ethanol with animal charcoal, filtered through highly purified diatomaceous earth and the filtrate reduced in volume to a certain extent, whereupon the resulting 2-chloro-6H-dibenz [b,e] thiepin-11-one separates. After recrystallization from ethanol, the compound melts at 134°–136°.

EXAMPLE 4

2-chloro-11-[1'-dimethylaminopropylidene-(3')]-6H-dibenz [b,e] thiepin a. 2-chloro-11-[1'-dimethylaminopropyl-(3')]-11-hydroxy-6H-dibenz [b,e] thiepin The desired compound is obtained in the same manner as described in example 1a, from 3-dimethylamino-1-propyl chloride and 2-chloro-6H-dibenz [b,e] thiepin-11-one by Grignardization and subsequent hydrolysis. After purification with animal charcoal and recrystallization from ethanol/pentane the resulting 2-chloro-11-[1'-dimethylamino-propyl-(3')]-11-hydroxy-6H-dibenz [b,e] thiepin melts at 154°–155°.

b. 2-chloro-11-[1'-dimethylaminopropylidene-(3')]-6H-dibenz [b,e] thiepin

A solution of 5.0 g. of 2-chloro-11-[1'-dimethylamino-propyl-(3')]-11-hydroxy-6H-dibenz [b,e] thiepin in 50 cc. of glacial acetic acid is heated to boiling with 20 cc. of concentrated hydrochloric acid for 1 hour. Further operations are as described in example 1b. The 2-chloro-11-[1'-dimethylaminopropylidene-(3')]-6H-dibenz [b,e] thiepin obtained as an oil is reacted with ethanolic oxalic acid. After recrystallization from ethanol, the acid oxalate melts at 215°–216°.

EXAMPLE 5

2-chloro-11-[1'-piperidinopropylidene-(3')]-6H-dibenz [b,e] thiepin a. 2-chloro-11-[1'piperidinopropyl-(3')]-11-hydroxy-6H-dibenz [b,e] thiepin In the same manner as described in example 1a, the desired compound is obtained from piperidinopropyl chloride and 2-chloro-6H-dibenz [b,e] thiepin-11-one by Grignardization and subsequent hydrolysis. After purification with animal charcoal and recrystallization from ethanol, the resulting 2-chloro-11-[1'-piperidinopropyl-(3')]-11-hydroxy-6H-dibenz [b,e] thiepin melts at 195°–197°.

b. 2-chloro-11-[1'-piperidinopropylidene-(3')]-6H-dibenz [b,e] thiepin

A solution of 4.0 g. of 2-chloro-11-[1'-piperidinopropyl-(3')]-11-hydroxy-6H-dibenz [b,e] thiepin in 40 cc. of glacial acetic acid is heated to boiling for 1 hour with 16 cc. of concentrated hydrochloric acid. Further operations are as described in example 1b. After purification with animal charcoal, the resulting 2-chloro-11-[1'-piperidinopropylidene-(3')]-6H-dibenz [b,e] thiepin, which forms an oil, is converted into the acid fumarate with ethanolic fumaric acid. After recrystallizing from ethanol, the acid fumarate melts at 240°–245°.

EXAMPLE 6

2-chloro-11- β-[1'-methyl-piperidyl-(2')-ethylidene] -6H-dibenz[b,e]thiepin a. 2-chloro-11- β-[1'-methyl-piperidyl-(2')-ethyl] -11-hydroxy-6H-dibenz[b,e]thiepin In the same way as described in example 1, the desired compound is obtained as an oil from 1-[1'-methyl-piperidyl-(2')]-2-chloroethane and 2-chloro-6H-dibenz[b,e]thiepin-11-one, by Grignardization and subsequent hydrolysis. This is purified chromatographically on aluminum oxide and eluted with benzene.

b. 2-chloro-11- β-[1'-methyl-piperidyl-(2')-ethylidene] -6H-dibenz[b,e]thiepin.

Water is split off from the 11-hydroxy compound in a manner similar to that described in example 1b. After working up, a solution of the resulting residue in 20 cc. ethanol is saturated with gaseous hydrogen bromide, whereupon the 2-chloro-11- β-[1'-methyl-piperidyl-(2')-ethylidene] -6H-dibenz[b,e]thiepin hydrobromide separates in crystalline form. After recrystallization from ethanol, the hydrobromide melts at 245°–260°.

EXAMPLE 7

2-methylthio-11-[1'-dimethylaminopropylidene-(3')]-6H-dibenz[b,e]thiepin a. 2-methylthio-11-[1'-dimethylaminopropyl-(3')]-11-hydroxy-6H-dibenz[b,e]thiepin In the same way as described in example 1a, the desired compound is obtained from 3-dimethylamino-1-propyl chloride and 2-methylthio-6H-dibenz [b,e] thiepin-11-one by Grignardization and subsequent hydrolysis. The resulting 2-methylthio-11-[1'-dimethylaminopropyl-(3')]-11-hydroxy-6H-dibenz [b,e] thiepin melts at 137°–138° on recrystallizing from acetone.

b. 2-methylthio-11-[1'-dimethylaminopropylidene-(3')]-6H-dibenz [b,e] thiepin

A solution of 4.0 g. of 2-methylthio-11-[1'-dimethylaminopropyl-(3')]-11-hydroxy-6H-dibenz [b,e] thiepin in 40 cc. of glacial acetic acid is heated to boiling for 1 hour with 16 cc. of concentrated hydrochloric acid. Subsequent operations are as described in example 1b. The resulting 2-methylthio-11-[1'-dimethylaminopropylidine-(3')]-6H-dibenz [b,e] thiepin forms an oil; this is converted into the acid oxalate with ethanolic oxalic acid. After recrystallization from ethanol, the compound melts at 180°–185°.

The 2-methylthio-6H-dibenz [b,e] thiepin-11-one which is used as starting material is produced as follows:

2-(p-methylthio-phenylthiomethyl)-benzoic acid ethyl ester 39.7 g. of 2-chloromethyl-benzoic acid ethyl ester are added dropwise to a solution of 31.2 g. of p-methylthio-thiophenol (b.p. 135°/13 mm. Hg.), 8.0 g. of sodium hydroxide in 40 cc. of water and 150 cc. of ethanol. The mixture is heated to boiling for 1 hour under reflux. Subsequent operations are as described in example 1b, (Preparation of starting material). The compound distills at an air-bath temperature of 160°, under a pressure of 0.01 mm. Hg.

2-(p-methylthio-phenylthiomethyl)-benzoic acid

M.p. 135°–137° from ethanol/pentane produced in a manner analogous to that described in example 1b, (Production of starting material) from the corresponding ethyl ester.

2-methylthio-6H-dibenz [b,e] thiepin-11-one

One hundred g. of 2-(p-methylthiophenylthiomethyl)-benzoic acid are added to a mixture of 285 g. of phosphorus pentoxide and 190 cc. of 85 percent phosphoric acid in 2,000 cc. of toluene, while stirring vigorously and at the boiling temperature under reflux. Further operations are as described in example 1b, (Production of initial material). M.p. 92°–94° from ethanol.

EXAMPLE 8

2-methylthio-11-[1'-methyl-piperidylidene-(4')]-6H-dibenz[b,e]thiepin a. 2-methylthio-11-[1'-methyl-piperidyl-(4')]-11-hydroxy-6H-dibenz [b,e] thiepin As described in example 1a, the desired compound is obtained from 1-methyl-4-chloro-piperidine and 2-methylthio-6H-dibenz [b,e] thiepin-11-one by Grignardization and subsequent hydrolysis. The resulting 2-methylthio-11-[1'-methyl-piperidyl-(4')]-11-hydroxy-6H-dibenz [b,e] thiepin, on crystallization from acetone, melts at 178°–180°.

b. 2-methylthio-11-[1'-methyl-piperidylidene-(4')]-6H-dibenz[b,e] thiepin

Water is split off from the 11-hydroxy compound in a manner analogous to that described in example 1b. The resulting 2-methylthio-11-[1'-methyl-piperidylidene-(4')]-6H-dibenz [b,e] thiepin, which forms an oil, is triturated with pentane, whereupon the compound crystallizes. M.p. 154°–155°.

EXAMPLE 9

2-methoxy-11-[1'-dimethylaminopropylidene-(3')]-6H-dibenz [b,e] thiepin a. 2-methoxy-11-[1'-dimethylaminopropyl-(3')]-11-hydroxy-6H-dibenz [b,e] thiepin As described in example 1a, the desired compound is obtained from 3-dimethylamino-1-propyl chloride and 2-methoxy-6H-dibenz [b,e] thiepin-11-one by Grignardization and subsequent hydrolysis. M.p. 123°–125° from acetone.

b. 2-methoxy-11-[1'-dimethylaminopropylidene-(3')]-6H-dibenz [b,e] thiepin

Water is split off from the 11-hydroxy compound in a manner analogous to that described in example 1b. The resulting 2-methoxy-11-[1'-dimethylaminopropylidene-(3')]-6H-dibenz[b,e] thiepin, which forms an oil, is converted into the acid oxalate with ethanolic oxalic acid. After recrystallization from ethanol, the acid oxalate melts at 187°–189°.

The 2-methoxy-6H-dibenz [b,e] thiepin-11-one, which is used as starting material, is produced as follows:

2-(p-methoxyphenyl-thiomethyl)-benzoid acid ethyl ester 39.7 g. of 2-chloromethyl-benzoic acid ethyl ester are added dropwise to a solution of 28.0 g. of p-methoxy-thiophenol (b.p. 105°/14 mm. Hg.), 8.0 g. of sodium hydroxide in 40 cc. of water and 150 cc. of ethanol. The mixture is heated to boiling for 1 hour under reflux; further operations are described in example 1b. (Preparation of starting material). The compound distills at 175°–180°, under a pressure of 0.05 mm. Hg.

2-(p-methoxyphenyl-thiomethyl)-benzoic acid

M.p. 124°–126° from ethanol/pentane produced from the corresponding ethyl ester in a manner analogous to that described in example 1b. (Preparation of starting material).

2-methoxy-6H-dibenz [b,3] thiepin-11-one

One hundred g. of 2-(p-methoxyphenylthiomethyl) benzoic acid are added to a mixture of 300 g. of phosphorus pentoxide and 200 cc. of 85 percent phosphoric acid in 2,000 cc. of toluene, while stirring vigorously at the boiling temperature under reflux. Further operations are as described in example 1b. (Preparation of starting material). M.P. 94°–96°, after recrystallization from ethanol.

EXAMPLE 10

2-methoxy-11-[1'-methyl-piperidylidene-(4')]-6H-dibenz [b,e] thiepin a. 2-methoxy-11-[1'-methyl-piperidyl-(4')]-11-hydroxy-6H-dibenz [b,e] thiepin As described in example 1a, the desired compound is obtained from 1-methyl-4-chloro-piperidine and 2-methoxy-6H-dibenz [b,e] thiepin-11-one by Grignardization and subsequent hydrolysis. M.p. 182°–185° from acetone.

b. 2-methoxy-11-[1'-methyl-piperidylidene-(4')]6H-dibenz [b,e] thiepin

Water is split off from the 11-hydroxy compound in a manner analogous to that described in example 1b. The resulting 2-methoxy-11 -[1'-methyl-piperidylidene-(4')]-6H-dibenz [b,e] thiepin forms an oil. Pentane is added, whereupon the compound crystallizes. M.p. 120°–121°.

EXAMPLE 11

2-methoxy-11-{β-[1'-methyl-piperidyl-(2')-ethylidene]}-6H-dibenz [b,e] thiepin a. 2-methoxy-{β-[1'-methyl-piperidyl-(2')-ethyl]}-11-hydroxy-6H-dibenz [b,e] thiepin As described in example 1a, the desired compound is obtained from 1-[1'-methyl-piperidyl-(2')]-2-chloroethane and 2-methoxy-6H-dibenz[b,e]thiepin-11-one by Grignardization and subsequent hydrolysis. M.p. 141°-142° from acetone.

b. 2-methoxy-11-{β-[1'-methyl-piperidyl-(2')-ethylidene]}-6H-dibenz [b,e] thiepin Water is split off from the 11-hydroxy compound in a manner analogous to that described in example 1b. After working up, 10 cc. of ethanol which is saturated with gaseous hydrogen chloride are added to a solution of the resultant residue in 10 cc. ethanol. The solution is reduced in volume to a certain extent, whereupon the 2-methoxy-11-{β-[1'-methyl-piperidyl-(2')-ethylidene]}-6H-dibenz [b,e] thiepin hydrochloride precipitates in crystalline form. After recrystallization from ethanol/ether, the hydrochloride melts at 204°-211°.

EXAMPLE 12

2-chloro-11-{β-[1'-methyl-pyrrolidyl-(2')-ethylidene]}-6H-dibenz[b,e] thiepin a. 2-chloro-11-{β-[1'methyl-pyrrolidyl-(2')-ethyl]}-11-hydroxy-6H-dibenz [b,e] thiepin 4.2 g. of iodine activated magnesium are covered with a little tetrahydrofuran and 0.15 cc. of ethylene bromide added. When the reaction starts, a solution of 24.7 g. of 1-[1'-methyl-pyrrolidyl-(2')]-2-chloroethane in 25 cc. of tetrahydrofuran is added at such a rate that the solvent boils. The reaction mixture is subsequently heated to boiling for 1 hour. A solution of 20.0 g. of 2-chloro-6H-dibenz [b,e] thiepin-11-one (m.p. 134°-136°) in 60 cc. of tetrahydrofuran is then added at zero degrees over a period of 15 minutes, and the mixture stirred for 30 minutes, at the same temperature. The reaction mixture is then poured into a solution of 135 g. of ammonium chloride in 400 cc. of water, diluted with 300 cc. of ether and filtered through high-purity diatomaceous earth. After separation of the ethereal phase, the aqueous portion is shaken out with a further 200 cc. of ether, the united ethereal solutions washed with water, dried over magnesium sulfate and evaporated. 30 cc. of ethanol are added to the oily residue, whereupon the 2-chloro-11-{β-[1'-methyl-pyrrolidyl-(2')-ethyl]}-11-hydroxy-6H-dibenz [b,e] thiepin commences to crystallize. The compound melts at 130°-132° after recrystallization from ethanol.

b. 2-chloro-11-{β-[1'-methyl-pyrrolidyl-(2')-ethylidene]}-6H-dibenz [b,e] thiepin A solution of 4.0 g. of 2-chloro-11{β-[1'-methyl-pyrrolidyl-(2')-ethyl]}-11-hydroxy-6H-dibenz [b,e] thiepin in 40 cc. of glacial acetic acid is heated with 16 cc. of concentrated hydrochloric acid for 1 hour to boiling. The solvent is then removed under a pressure of 15 mm. Hg., the residue made alkaline with 2N sodium hydroxide and shaken with three 100 cc. portions of ether. After washing the ether extract with water and drying over magnesium sulfate, the solvent is removed and the oily residue of 2-chloro-11-{β-[1'-methyl-pyrrolidyl-(2')-ethylidene]}-6H-dibenz [b,e] thiepin reacted with the calculated amount of ethanolic oxalic acid. The acid oxalate melts at 185°-187° after recrystallization from ethanol.

The production of the starting material, 2-chloro-6H-dibenz [b,e] thiepin-11-one is described in example 3.

The remaining examples 13–20 are summarized in the following table; in all these examples, the procedure is analogous to that of the example 12.

TABLE I

| Ex. No. | Compounds of Formula I | Intermediates of Formula IV | Starting materials | |
|---|---|---|---|---|
| 13 | 2-chloro-11-[1'-methyl-piperidyl-(3')-methylidene]-6H-dibenz[b,e]thiepin. | 2-chloro-11-[1'-methyl-piperidyl-(3')-methyl]-11-hydroxy-6H-dibenz[b,e]thiepin. | 1-methyl-piperidyl-(3)-chloromethane. | 2-chloro-6H-dibenz[b,e]thiepin-11-one.[1] |
| | Acid fumarate. m.p. 130–135° from ethanol | M.P. 170–175° from ethanol | | M.P. 134–136° from ethanol. |
| 14 | 2-chloro-11-[1'-piperidino-2'-methyl-propylidene-(3')-6H-dibenz[b,e]thiepin. | 2-chloro-11-[1'-piperidino-2'-methyl-propyl-(3')]-11-hydroxy-6H-dibenz[b,e]thiepin. | 1-piperidino-2-methyl-3-chloropropane. | 2-chloro-6H-dibenz[b,e]-thiepin-11-one.[1] |
| | Acid oxalate. m.p. 211–215° from acetone | M.P. 163–165° from acetone. | | M.P. 134–136° from ethanol. |
| 15 | 2-methyl-11-[1'-methyl-piperidyl-(3')-methylidene-6H-dibenz[b,e]thiepin. | 2-methyl-11-[1'-methyl-piperidyl-(3')-methyl]-11-hydroxy-6H-dibenz[b,e]thiepin. | 1-methyl-piperidyl-(3)-chloromethane. | 2-methyl-6H-dibenz[b,e]-thiepin-11-one.[2] |
| | Acid fumarate. m.p. 215–220°. | M.P. 157–162° from ethanol/pentane. | | M.P. 121–122° from ethanol. |
| 16 | 2-methyl-11-{β-[1'-methyl-piperidyl-(2')-ethylidene]}-6H-dibenz[b,e]thiepin. | 2-methyl-11-{β-[1'-methyl-piperidyl-(2')-ethyl]}-11-hydroxy-6H-dibenz[b,e]thiepin. | 1-[1'-methyl-piperidyl-(2')]-2-chloroethane. | 2-methyl-6H-dibenz[b,e]-thiepin-11-one.[2] |
| | Hydrobromide. m.p. 219–225° from acetone. | M.P. 188–191° from acetone.[5] | | M.P. 121–122° from ethanol. |
| 17 | 2-methyl-11-{β-[1'-methyl-pyrrolidyl-(2')-ethylidene]}-6H-dibenz[b,e]thiepin. | 2-methyl-11-{β-[1'-methyl-pyrolidyl-(2')-ethyl]}-11-hydroxy-6H-dibenz[b,e]thiepin. | 1-[1'-methyl-pyrrolidyl-(2')]-2-chloroethane. | 2-methyl-6H-dibenz[b,e]-thiepin-11-one.[2] |
| | Acid oxalate. m.p. 170–175° from ethanol. | M.P. 138–145° from ethanol. | | M.P. 121–122° from ethanol. |
| 18 | 2-methoxy-11-[1'-methyl-piperidyl-(3')-methylidene]-6H-debenz[b,e]-thiepin. | 2-methoxy-11-[1'-methyl-piperidyl-(3')-methyl]-11-hydroxy-6H-dibenz[b,e]thiepin. | 1-methyl-piperidyl-(3)-chloromethane. | 2-methoxy-6H-dibenz[b,e]-thiepin-11-one.[4] |
| | Acid fumarate. m.p. 200–207° from ethanol. | M.P. 175–180° from ethanol. | | M.P. 94–96° from ethanol. |
| 19 | 2-methylthio-11-{β-[1'-methyl-piperidyl-(2')-ethylidene]}-6H-dibenz[b,e]thiepin. | 2-methylthio-11-{β-[1'-methyl-piperidyl-(2')-ethyl]}-11-hydroxy-6H-dibenz[b,e]thiepin. | 1-[1'-methyl-piperidyl-(2')]-2-chloroethane. | 2-methylthio-6H-dibenz-[b,e]thiepin-11-one.[3] |
| | Hydrobromide. m.p. 260–264°. | M.P. 132–133° from acetone.[5] | | M.P. 92–94° from ethanol. |
| 20 | 2-methylthio-11-[1'-morpholino-2'-methyl-propylidene-(3')]-6H-dibenz[b,e]thiepin. | 2-methylthio-11-[1'-morpholino-2'-methyl-propyl-(3')]-11-hydroxy-6H-dibenz[b,e]thiepin. | 1-morpholino-2-methyl-3-chloropropane. | 2-methylthio-6H-dibenz-[b,e]thiepin-11-one.[3] |
| | Acid fumarate. m.p. 156–160° from ethanol. | M.P. 184–190° from acetone.[5] | | M.P. 92–94° from ethanol. |

[1] Production, Example 3.  [2] Production, Example 1.  [3] Production, Example 7.  [4] Production, Example 9.  [5] The compound is purified on Al₂O₃ before recrystallizing.

What is claimed is:

1. A 6H-dibenz[b,e]thiepin derivative selected from the group consisting of bases and their acid addition salts, said bases being compounds of the formula:

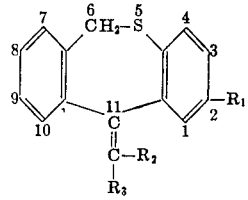

wherein $R_1$ is a member selected from the group consisting of halogen, lower alkyl, lower alkoxy and lower alkylthio, $R_2$ stands for hydrogen, $R_3$ represents a member selected from the group consisting of lower dialkylamino ethyl, piperidino ethyl, pyrrolidino ethyl, morpholino ethyl, 2-(piperidino)-1-lower alkyl ethyl, and $R_2$ and $R_3$ together with the carbon atoms to which they are joined represent 1-lower alkyl-piperidylidene-(4).

2. A 6H-dibenz[b,e]thiepin derivative selected from the group consisting of bases and their acid addition salts, said bases being compounds of the formula:

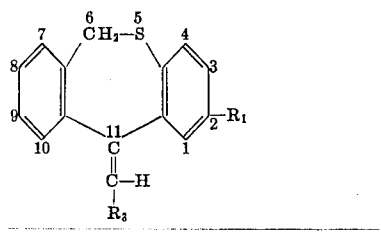

wherein $R_1$ is a member selected from the group consisting of halogen, lower alkyl, lower alkoxy and lower alkylthio, and $R_3$ is a member selected from the group consisting of piperidino ethyl, pyrrolidino ethyl, morpholino ethyl, 2-(piperidino)-1-lower alkyl ethyl.

3. A 6H-dibenz[b,e]thiepin derivative selected from the group consisting of bases and their acid addition salts, said bases being compounds of the formula:

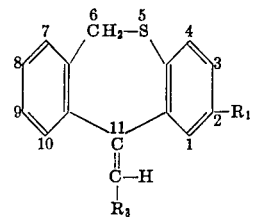

wherein $R_1$ is a member selected from the group consisting of halogen, lower alkoxy and lower alkylthio, and $R_3$ is lower dialkylamino ethyl.

4. 2-methyl-11-[1'-methyl-piperidylidene-(4')]-6H-dibenz[b,e]thiepin
5. 2-chloro-11-[1'-methyl-piperidylidene-(4')]-6H-dibenz[b,e]thiepin.
6. 2-chloro-11-[1'-dimethylaminopropylidene-(3')]-6H-dibenz[b,e]thiepin.
7. 2chloro-11-[1'-piperidinopropylidene-(3')]-6H-dibenz[b,e]thiepin.
8. 2methylthio-11-[1'-dimethylaminopropylidene-(3')]-6H-dibenz[b,e]thiepin.
9. 2-methylthio-11-[1'-methyl-piperidylidene-(4')]-6H-dibenz[b,e]thiepin.
10. 2-methoxy-11-[1'-dimethylaminopropylidene 3')]-6H-dibenz[b,e]thiepin.
11. 2-methoxy-11-[1'-methyl-piperidylidene-(4')]-6H-dibenz[b,e]thiepin.
12. 2chloro-11[1'-piperidino-2'-methyl-propylidene-(3')]-6H-dibenz[b,e]thiepin.
13. 2-methylthio-11-[1'-morpholino-2'-methyl-propylidene-(3')]-6H-dibenz[b,e]thiepin.
14. 2-methoxy-11-{β-[1'-methyl-piperidyl-(2')-ethylidene]}-6H-dibenz[b,e]thiepin.
15. 2-chloro-11-{β-[1'-methyl-pyrrolidyl-(2')-ethylidene]} -6H-dibenz[b,e]thiepin.
16. 2-chloro-11-[1'-methyl-piperidyl-(3')-methylidene]-6H-dibenz[b,e]thiepin.

* * * * *